United States Patent
Kotani

[19]

[11] Patent Number: 6,141,162
[45] Date of Patent: Oct. 31, 2000

[54] MAGNETIC RECORDING DEVICE

[75] Inventor: Takumi Kotani, Tokyo, Japan

[73] Assignee: NEC Corporation, Tokyo, Japan

[21] Appl. No.: 09/095,564

[22] Filed: Jun. 11, 1998

[30] Foreign Application Priority Data

Jun. 20, 1997 [JP] Japan ..................... 9-163175

[51] Int. Cl.[7] ........................................ G11B 5/09
[52] U.S. Cl. ............................... 360/46; 360/68
[58] Field of Search ................... 360/67, 46, 68, 360/31, 53

[56] References Cited

U.S. PATENT DOCUMENTS

| 5,434,717 | 7/1995 | Yoshinaga et al. | 360/46 |
| 5,600,500 | 2/1997 | Madsen et al. | 360/46 |
| 5,808,820 | 9/1998 | Iwama | 360/62 |

OTHER PUBLICATIONS

English translation of Japanese Office Action dated Feb. 23, Hei 11.

Primary Examiner—Andrew L. Sniezek
Assistant Examiner—Dan I. Davidson
Attorney, Agent, or Firm—McGuireWoods, LLP

[57] ABSTRACT

A write operation to a magnetic recording medium (10) is performed by supplying a predetermined write current to a write head (1) from an R/W signal processing portion (2) through a head composite signal processing portion (3), and a rewrite operation is performed by supplying a rewrite current having a value different from that of the predetermined write current to the magnetic head (1) by supplying a write current having a value different from the predetermined write current under a control of a hard disk controller (6) when an abnormality is detected by a head abnormality detection circuit (5) in the write operation with the predetermined write current. When an abnormality is further detected by the head abnormality detection circuit (5), the data write is judged as abnormal.

10 Claims, 3 Drawing Sheets

MAGNETIC RECORDING DEVICE

BACKGROUND OF THE INVENTION

The present invention claims priority from Japanese Patent Application No. 9-163175 filed Jun. 20, 1997, which is incorporated herein by reference.

1. Field of the Invention

The present invention relates to a magnetic recording device and, particularly, to a detection of a write abnormality of the same magnetic recording device.

2. Description of Related Art

In order to detect an open-circuit or short-circuit abnormality of a write magnetic head of a conventional magnetic recording device, a head drive circuit thereof includes a head abnormality detection circuit. In a general head abnormality detection circuit, the normality of a head current is monitored by detecting a level of a counter electromotive force pulse voltage generated at switching time of the head current. That is, when an abnormality such as open-circuit or short-circuit is generated in the magnetic head, voltage having a predetermined level is not detected, from which the abnormality of the magnetic head can be detected. When such abnormality is detected, the head abnormality detection circuit outputs a fault pulse with which the head drive circuit enters into a write interruption mode.

FIG. 1 shows a construction of a magnetic recording device disclosed in Japanese Patent Application Laid-open No. Sho 64-13204, as an example of the prior art device. In this example, collectors of transistors 101 and 102 are connected to opposite terminals of a write magnetic head 51 and to set terminals of flip-flops 106 and 107, respectively, and collectors of transistors 103 and 104 are connected to opposite terminals of a magnetic head 52 and to reset terminals of the flip-flops 106 and 107, respectively. Write data a and b are connected to bases of the respective transistors 101 and 102. When the write data a becomes high level, the transistor 101 is turned on and a current flows through the head 51 is a direction 53. On the other hand, when the write data b becomes high level, the transistor 102 is turned on and a current flows through the head 51 in a direction opposite to the direction 53. In a case where a current flows through the head 51 normally, the opposite terminals of the head 51 become low level for either the write data a or b and the flip-flops 106 and 107 are set.

Similarly, when a current flows through the head 52 normally, the flip-flops 106 and 107 are set. On the other hand, an abnormality detection circuit 108 is input with outputs e and f of the flip-flops 106 and 107 and a logical sum t of write signals a, b, c and d and it is judged, from these three signals, whether or not the magnetic heads 51 and 52 are open-circuited.

In the prior art example, however, there is a problem that the head abnormality detection circuit malfunctions. That is, the condition for such as over-write or non-linear bit shift becomes more severe with increase of the data transfer rate and the probability of malfunction is increased due to noise overlapped on a power source and/or a grounding line or influence of inductance thereof, so that the head abnormality detection circuit malfunctions even when a normal write current flows through the heads. When such erroneous operation of the head abnormality detection circuit occurs, the magnetic recording device which is operating normally is decided as having an open-circuit or short-circuit abnormality and the write operation of the device is interrupted.

SUMMARY OF THE INVENTION

An object of the present invention is to provide a write abnormality detection method for use in a magnetic recording device for detecting an abnormality of write operation of the magnetic recording device.

Another object of the present invention is to provide a reliable magnetic recording device capable of preventing a stoppage of write operation caused by an erroneous judgement made by a head abnormality detection circuit of the magnetic recording device due to a variation of sensitivity of the head abnormality detection circuit from occurring.

According to a first aspect of the present invention, the write abnormality detection method for detecting an abnormality of operation of data write to a recording medium by monitoring a write current supplied to magnetic heads of a magnetic recording device, comprises the steps of performing a write operation of the magnetic recording device by supplying a predetermined write current to the magnetic heads, performing again a write operation of the magnetic recording device by supplying a write current having a value different from the predetermined write current to the magnetic heads when an abnormality of the predetermined write current is detected and judging a data write abnormality when an abnormality is still detected.

When an abnormality is detected during the operation with the predetermined write current, it is preferable to perform a write operation again while changing a write area on the magnetic recording medium outside a data area.

The re-write operation is preferably performed twice with a current larger than the predetermined write current and a current smaller than the predetermined write current.

That is, in the present invention, when an abnormality is detected during a write operation, it is confirmed whether or not the abnormality is a real abnormality by not interrupting the write operation immediately but performing a write operation again. That is, the re-write operation is preferably performed in an area of the recording medium outside the data area thereof with, for example, a larger current than the predetermined write current. When there is no abnormality detected by this re-write operation, it is decided that the previously detected abnormality is erroneous and the write operation is continued. When there is an abnormality detected by this re-write operation with the increased write current, it is preferable to perform a re-write operation again with a write current smaller than the predetermined write current. If there is no abnormality detected by the second re-write operation, the write operation is continued. If there is an abnormality detected by the second re-write operation, it is decided that there is an abnormality of data write.

According to a second aspect of the present invention, a magnetic disk device comprises magnetic heads for writing data in a magnetic recording medium, write processor means for supplying a write current corresponding to data to be written in the magnetic recording medium, abnormality detection means for detecting an abnormality of write current supplied from the write processor means to the magnetic heads and control means for controlling the write processor means correspondingly to an output signal of the abnormality detection means.

The control means comprises rewrite control means for performing a rewrite operation by supplying a write current having a value different from that of the predetermined write current to the magnetic heads when the abnormality detection means detects an abnormality while the write processor means is supplying the predetermined write current to the magnetic heads and write continuation control means for continuing the write operation during which the abnormality is detected, when the abnormality detection means detects no abnormality during the data is written by the rewrite control means.

The rewrite control means may comprise means for increasing a write current to a value larger than the predetermined write current and/or means for reducing a write current to a value smaller than the predetermined write current. The rewrite control means preferably further comprises means for driving the magnetic heads to an area of the magnetic recording medium outside the data recording area thereof and performing a write operation in that area.

The rewrite control means may comprises means for increasing a write current to a value larger than the predetermined write current and/or means for reducing a write current to a value smaller than the predetermined write current.

DETAILED DESCRIPTION OF PREFERRED EMBODIMENTS

Figure 1:
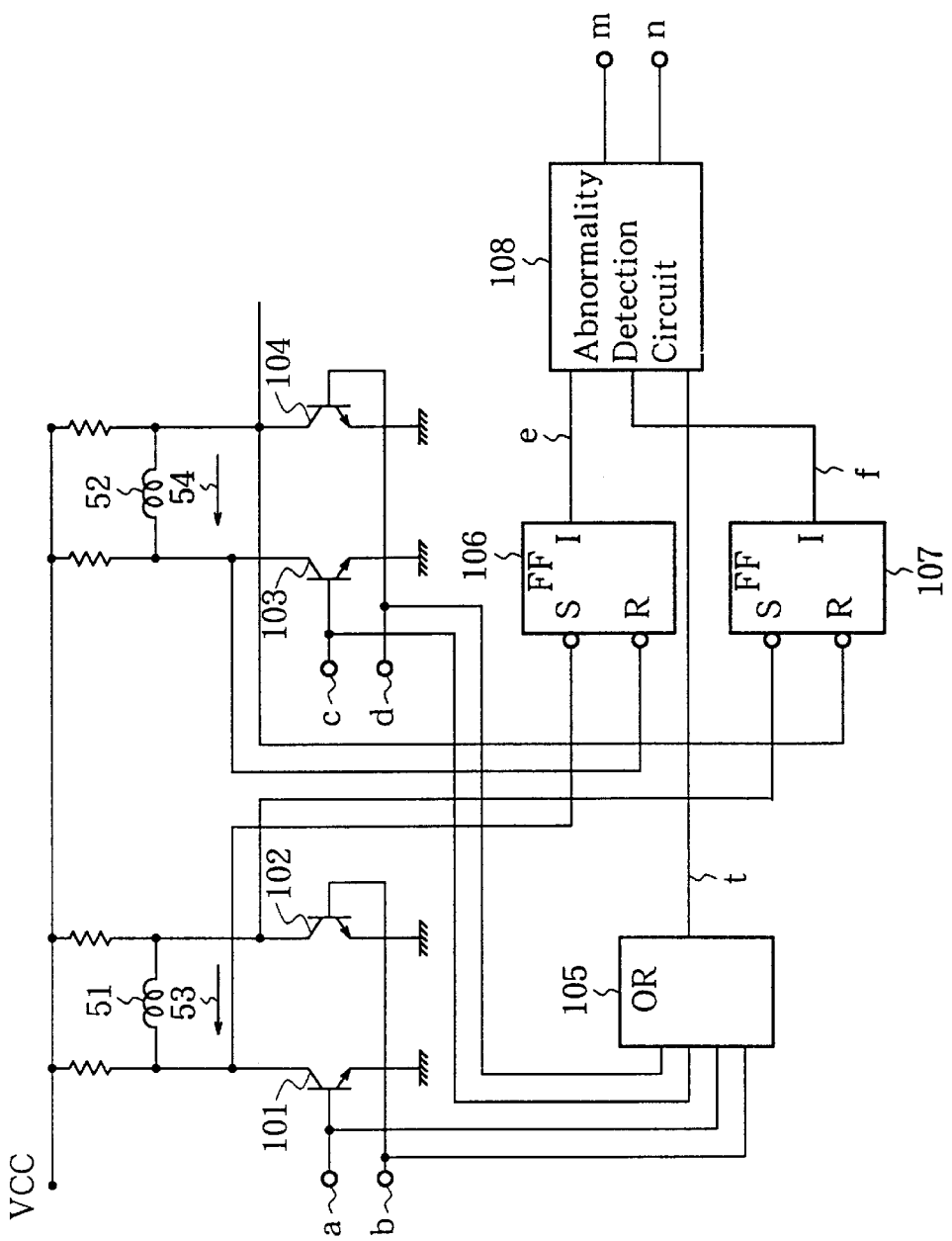
FIG. 1 is a block diagram showing a conventional magnetic disk device.
Figure 2:
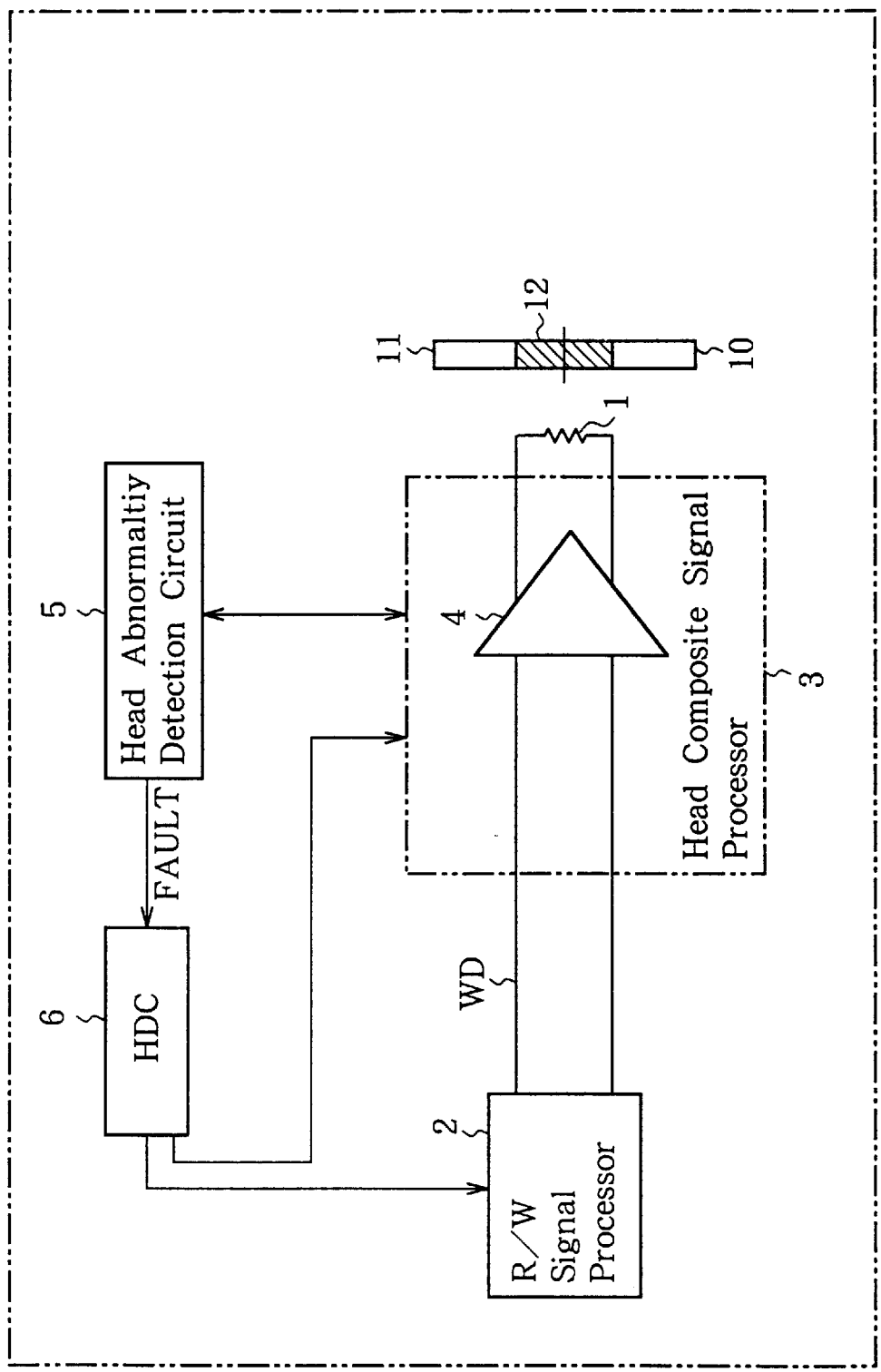
FIG. 2 is a block diagram showing an embodiment of the present invention.

A magnetic disk device shown in FIG. 1 comprises a magnetic head, that is, a write head 1 for performing a data write to a magnetic recording medium 10, an R/W (write/read) signal processing portion 2 and a head composite signal processing portion 3 for supplying a write current to the write head 1 correspondingly to data to be written in the magnetic recording medium 10, a head abnormality detection circuit 5 for detecting a write current supplied from the head composite signal processing portion 3 to the write head 1 and a hard disk controller (HDC) 6 for controlling the R/W signal processing portion 2 and the head composite signal processing portion 3 correspondingly to the output signal of the head abnormality detection circuit 5. The head composite signal processing portion 3 includes a write driver 4.

The R/W signal processing portion 3 generates a write data WD. The head composite signal processing portion 3 processes the write data WD from the R/W signal processing portion 2 and an output signal of the head composite signal processing portion 3 is wave-shaped by the write driver 4 and output to the write head 1. The head abnormality detection circuit 5 judges whether or not a current flows from the write driver 4 to the write head 1, that is, confirms an open-circuit or a short-circuit condition and, when there is an abnormality, makes a fault signal FAULT active. The hard disk controller 6 monitors this fault signal and, when necessary, outputs a write gate signal WG to control the R/W signal processing portion 2 such that the write operation is stopped.

Figure 3:
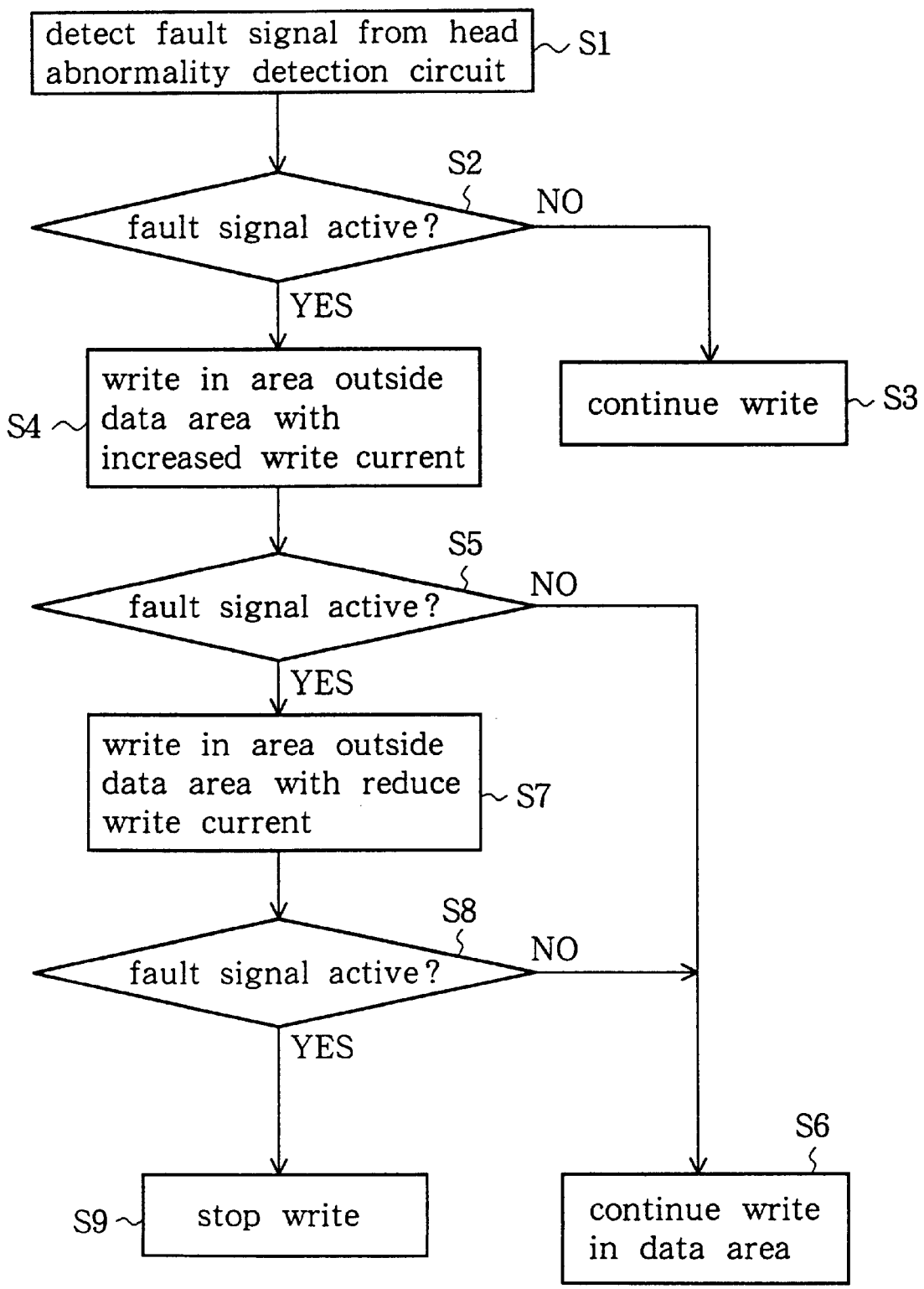
FIG. 3 is a flowchart showing a control operation of a hard disk controller of the embodiment shown in FIG. 2.

Next, an overall operation of this embodiment will be described with reference to a flowchart in FIG. 3 showing a control operation of the hard disk controller 6.

During a normal operation, a predetermined write current is supplied from the R/W signal processing portion 2 through the head composite signal processing portion 3 to the write head 1. In this state, the hard disk controller 6 monitors the fault signal FAULT output from the head abnormality detection circuit 5 (step S1). The fault signal FAULT becomes active when the head abnormality detection circuit 5 detects an abnormality and the hard disk controller 6 controls to continue the write operation unless the fault signal FAULT becomes active (steps S2, S3).

When the fault signal FAULT becomes active during the write operation with the predetermined write current, the hard disk controller 6 controls the write head 1 to shift from the data area 11 of the magnetic recording medium 10 to an area 12 outside the data area 11 and to perform a rewrite while increasing the write current to be supplied from the write driver 4 to the magnetic head 1 (step S4). When the fault signal FAULT does not become active by this rewrite operation (step S5), the hard disk controller 6 controls the write head 1 to shift from the area 12 outside the data area 11 to the data area 11 of the magnetic recording medium 10 and to continue the write operation (step S6).

When the fault signal FAULT is active in the rewrite operation with the increased write current (step S5), the hard disk controller 6 controls the device to perform a rewrite operation again with a reduced write current. When the fault signal FAULT does not become active by this rewrite operation (step S8), the hard disk controller controls the write head 1 to shift from the area 12 to the data area 11 of the magnetic recording medium and to continue the write operation (step S6).

When the fault signal FAULT is active in the rewrite operation with the reduced write current (step S8), the hard disk controller stops the write operation (step S9).

In this manner, it is possible to prevent the write operation from being stopped by an erroneous detection of data write abnormality by re-trying the write operation in the area outside the data area with using a different write current, even when the head abnormality is detected in the usual write operation.

According to the present invention, the yield of the device is improved. In the conventional magnetic recording device, the sensitivity of the head abnormality detection circuit is varied by the write current and the frequency characteristics of the head abnormality detection circuit is changed under the influence of high transfer rate, overlapped noise and inductance, etc. Therefore, the head abnormality detection circuit of the conventional magnetic recording device erroneously detects an abnormality of head regardless of abnormality due to open-circuit or short-circuit of the head. Contrary to such conventional magnetic recording device, in the present invention, it becomes possible to detect a head abnormality under stable level detection condition by changing the write current.

Further, by performing the rewrite operation in an area of the magnetic recording medium outside a data area thereof twice by increasing and decreasing the write current from a predetermined normal write current, respectively, it is possible to detect the head abnormality quickly. That is, since there is an optimal condition of the write current for the head abnormality detection circuit dependent on the characteristics of the R/W amplifier, the erroneous detection of the head abnormality detection circuit can be roughly judged by performing the rewrite operation with either increased or reduced write current with respect to the usual write current rather than performing the rewrite operation by increasing and then reducing the write current successively at one time.

Alternatively, it is possible, by performing a write operation in an area of a magnetic recording medium outside the data area thereof with an increased or reduced write current at a write test and a start-up of the magnetic recording device, to judge that there is no open-circuit or short-circuit abnormality when the fault signal FAULT from the head abnormality detection circuit 8 does not become active and to continue the write operation even if an abnormality is detected in the usual write operation. In such case, the necessity of testing during the usual operation of the magnetic recording device becomes removed.

What is claimed is:

1. An abnormality detection method of a magnetic recording device, for detecting an abnormality of a data write to a magnetic recording medium by monitoring a write current supplied to a magnetic head, comprising the steps of:

performing a write operation in a data area of the magnetic recording medium by supplying a predetermined write current to said magnetic head;

performing a rewrite operation by supplying a rewrite current having a value different from that of the predetermined write current to said magnetic head when an abnormality is detected in the write operation with the predetermined write current; and judging a data write abnormality when an abnormality is detected in the rewrite operation with the rewrite current.

2. An abnormality detection method of a magnetic recording device, for detecting an abnormality of a data write to a magnetic recording medium by monitoring a write current supplied to a magnetic head, comprising the steps of:

performing a write operation in a data area of the magnetic recording medium by supplying a predetermined write current to said magnetic head;

performing a rewrite operation by supplying a rewrite current having a value different from that of the predetermined write current to said magnetic head when an abnormality is detected in the write operation with the predetermined write current; and judging a data write abnormality when an abnormality is detected in the rewrite operation with the rewrite current, wherein the rewrite operation is performed in an area of the magnetic recording medium outside the data area thereof when the abnormality is detected during the write operation with the predetermined write current.

3. An abnormality detection method of a magnetic recording device, for detecting an abnormality of a data write to a magnetic recording medium by monitoring a write current supplied to a magnetic head, comprising the steps of:

performing a write operation in a data area of the magnetic recording medium by supplying a predetermined write current to said magnetic head;

performing a rewrite operation by supplying a rewrite current having a value different from that of the predetermined write current to said magnetic head when an abnormality is detected in the write operation with the predetermined write current; and judging a data write abnormality when an abnormality is detected in the rewrite operation with the rewrite current, wherein the rewrite operation is performed twice with rewrite currents larger and smaller than the predetermined write current, respectively, when the abnormality is detected in the write operation with the predetermined write current.

4. A magnetic disk device comprising:

a magnetic head for writing data in a magnetic recording medium;

write processor means for supplying a write current corresponding to data to be written in said magnetic recording medium;

abnormality detection means for detecting an abnormality of write current supplied from said write processor means to said magnetic head; and control means for controlling said write processor means in response to an output signal of said abnormality detection means, wherein said control means comprises rewrite control means for performing a rewrite operation by supplying a write current having a value different from that of a predetermined write current to said magnetic head when said abnormality detection means detects an abnormality while said write processor means is supplying the predetermined write current to said magnetic head, and write continuation control means for continuing a write operation during which the abnormality is detected when said abnormality detection means detects no abnormality when said abnormality means detects no adnormality while said rewrite control means is supplying the write current having a value different from said predetermined write current.

5. A magnetic recording device as claimed in claim 4, wherein said rewrite control means comprises means for increasing a write current to a value larger than the predetermined write current.

6. A magnetic recording device as claimed in claim 4, wherein said rewrite control means comprises means for reducing a write current to a value smaller than the predetermined write current.

7. A magnetic recording device as claimed in claim 4, wherein said rewrite control means comprises means for driving said magnetic head to an area of said magnetic recording medium outside the data recording area thereof and performing a write operation in that area.

8. A method for verifying a magnetic head abnormality during a data write operation, comprising the steps of:

performing a first data write operation with a magnetic head writing data to a recording medium with a first write current;

detecting an abnormality in said write operation;

performing a second data write operation with a second write current different from said first write current;

checking whether an abnormality exists with said second data write operation and if so, performing a third data write operation with a third write current different from said first write current and said second write current; and checking whether an abnormality exists with said third data write operation and, if so, halting further write operations.

9. A method for verifying a magnetic head abnormality during a write operation as recited in claim 8 wherein said second write current and said third write current are greater than and less than said first write current, respectively.

10. A method for verifying a magnetic head abnormality during a write operation as recited in claim 8 wherein said second and third write operations are performed at a location on said magnetic medium different than said first data write operation.

* * * * *